3,654,316
METHOD OF PREPARING COMENIC ACID AND
DERIVATIVES THEREOF
Shunichiro Oga and Kazuo Asano, Osaka, and Katsumi
Imada, Kyoto, Japan, assignors to Daiichi Seiyaku
Company, Ltd., Tokyo, Japan
No Drawing. Continuation-in-part of application Ser. No.
784,171, Dec. 16, 1968. This application Oct. 16, 1969,
Ser. No. 867,059
Claims priority, application Japan, Dec. 15, 1967,
42/80,050
Int. Cl. C07d 7/16
U.S. Cl. 260—345.7                18 Claims

ABSTRACT OF THE DISCLOSURE

A method for preparing a compound selected from the group consisting of comenic acid and its metal salt, which comprises heating an aqueous solution of a member selected from the group consisting of 2,5-diketo-gluconic acid and its metal salt selected from the group consisting of alkaline earth metal salts and alkali metal salts.

CROSS-REFERENCE TO RELATED APPLICATIONS

The present application is a continuation-in-part of application Ser. No. 784,171, filed Dec. 16, 1968, claiming priority based on Japanese application Ser. No. 80,050/67, filed Dec. 15, 1967.

BACKGROUND OF THE INVENTION

Field of the invention

The present invention relates to a novel method for preparing comenic acid (5-hydroxy-2-carboxy-4-pyrone), and more particularly to a process for preparing comenic acid from 2,5-diketo-gluconic acid and for obtaining comenic acid from the resultant reaction mixture. Further, the comenic acid may be obtained in the form of a metal salt or an ester thereof.

Description of the prior art

Few reports deal with the preparation of comenic acid. For instance, Aida et al. reported that the presence of comenic acid, rubiginic acid and rubiginol was confirmed by the paper chromatography of an incubated solution of 2,5-diketo-gluconic acid with Gluconoacetobacter liquefaciens and a phosphoric buffer. (Aida et al.; Bulletin of the Agricultural Chemical Society of Japan 21, 30–37 (1957).) Moreover, they reported that comenic acid and other γ-pyrone derivatives were produced by the fermentation of Gluconacetobacter liquefaciens in a medium containing glucose (9.3%), yeast extract (0.8%), and calcium carbonate (2.5%) for ten days (Aida et al.; Bulletin Agricultural Chemical Society, Japan 19, 97, (1955)). The latter fermentation method, however, is of no avail for manufacturing comenic acid because of its poor yield (e.g., only 0.5 g. comenic acid is obtained from 140 g. of glucose by the fermentation).

On the other hand, chemical methods have been known. Chemical procedures involve the oxidation of kojic acid of the decarboxylation of meconic acid. These methods are not economical because the starting materials are very expensive.

SUMMARY OF THE INVENTION

Comenic acid may be produced by heating an aqueous solution of 2,5-diketo-glyconic acid at a temperature within the range of 20–200° C. and at a pH of between 1.0 and 7.0. Comenic acid can be easily separated from the reaction mixture which contains γ-pyrone derivatives by recrystallization from water utilizing the solubility difference between comenic acid and the γ-pyrone derivatives. The salts of comenic acid are produced by reacting a metal salt of the gluconic acid by the present process, and esters are produced by effecting the present reaction in the presence of a lower alkyl alcohol and a mineral acid.

An object of the present invention is thus to provide a novel and valuable process for producing comenic acid which is useful for the preparation of maltol, a food additive useful as a flavor.

DETAILED DESCRIPTION OF THE INVENTION

It has been found as a result of experimentation by the inventors that 2,5-diketo-gluconic acid may be primarily converted to comenic acid and to other γ-pyrone derivatives in high yields. The reaction proceeds from 2,5-diketoglyconic acid (I) to comenic acid (II) as the results of dehydration and a rearrangement reaction as shown in the following scheme.

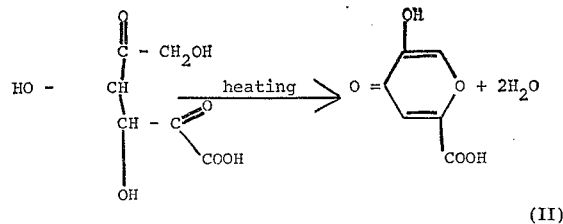

(II)

In accordance with the present invention, the comenic acid (II) is economically produced by heating an aqueous solution of 2,5-diketo-gluconic acid (I). The comenic acid can be separated in good yields from the reaction mixture along with other γ-pyrone derivatives produced as by-products.

The starting material used in the present invention, namely, 2,5-diketo-glyconic acid (I), is easily produced as a metabolite by known preparation methods, such as the fermentation of Gluconobacter melanogenum MA 62 and/ or oxidative bacterial belonging to Gluconoacetobacter liquefaciens, in a glucose medium. (Katznelson et al., J. Biol. Chem. 204 43 (1953); Aida et al., Bull. Agr. Chem. Soc. Japan 21, 30–37 (1957).)

According to the present invention, comenic acid (II) is produced by heating a 1–30% aqueous solution of 2,5-diketo-gluconic acid (I) or a fermentation liquor which contains 2,5-diketo-gluconic acid (I) at a temperature of 20–200° C. The preferred temperature range is from 50° C. to 120° C., and the pH of the reaction solution containing 2,5-diketo-gluconic acid (I) can be in the range of from 1.0 to 7.0, preferably from 1.0 to 4.0. Thus, the gluconic acid (I) is converted to various γ-pyrone derivatives.

It was found that 2,5-diketo-gluconic acid (I) was converted at a 20% greater yield into γ-pyrone derivatives in the presence of an alkali earth metal carbonate, such as calcium carbonate or barium carbonate, in the reaction solution (in comparison with the case without those salts of the alkali earth metals). The existence of a trace of iron-, nickel-, or cobalt-salts in the solution also affected the reaction in a favorable manner, illustrating a catalytic effect, though the reason why these metal ions work effectively has not been determined.

A large amount of comenic acid and small amounts of other γ-pyrone derivatives, such as rubiginic acid, pyromeconic acid, rubiginol, etc., which react positively with ferric sulfate, were extracted from the reaction mixture by an organic solvent such as ether.

The yield of γ-pyrone derivatives was negligibly influenced by reaction conditions. For example, a 5% aqueous solution of gluconic acid (I) was heated at 120° C. for about 30 minutes. The ratios of products formed are shown below:

Comenic acid:rubiginic acid:pyromeconic acid:Rubiginol:other ferric sulfate-positives=70:9.4:5.4:5.4:9.4.

In addition, a reaction product composed of a large portion of comenic acid and a trace of other γ-pyrone derivatives was produced by heating at 50° C. for several days.

Quantitative analysis of γ-pyrone derivatives was performed according to the kojic acid colorimetric method (Ishiie et al., Nippon Nogeikagakukaishi 46, 353–358 (1966)). The total amount of γ-pyrone (equal to comenic acid) was calculated from the optical density measured at 500 m$\mu$ by a spectrophotometer. Color formation was determined as follows:

One half milliliter of the test sample (containing γ-pyrone derivatives) was successively treated in a tube with 1.2 ml. of 10% sulfuric acid, 0.4 ml. of 5% ferric sulfate and 2.9 ml. of distilled water. The ratio of the amount of each γ-pyrone derivative was calculated by comparison with the value which was measured by the above-described colorimetric analysis, comparing the spots separated on a paper chromatogram obtained from the reaction mixture.

Comenic acid (II) was easily separated in a pure state from the other γ-pyrone derivatives by recrystallization from water, since comenic acid (II) has a much different solubility. In view of the above fact, extracts containing comenic acid and other γ-pyrone derivatives can be dissolved with water by heating, treated with charcoal, filtered under suction while kept warm, and the filtrate condensed under reduced pressure. Comenic acid then crystallizes. The recrystallization of comenic acid from water gives a pure plate or rosette crystal melting at 276° C. The crystal obtained is identical with standard comenic acid (produced by other preparation methods) in elementary analysis, UV spectrum analysis, IR spectrum analysis and mixed melting tests.

Furthermore, since the process of the present invention is effective when the gluconic acid is used in the form of a metal salt thereof, such as a salt of calcium, sodium, potassium, and the like, it is possible to use a fermentation solution used for obtaining said 2,5-diketo-gluconic acid, in the form as is, in the conversion reaction to comenic acid, so that it is very advantageous. The comenic acid, which is the desired product, is in a liberated form, and it is possible, as a matter of fact, to produce it in the form of a metal salt.

Also, it is easy to obtain an alkylester of comenic acid by the method of this invention. In other words, it is possible to obtain an alkyl comenate in one step by carrying out the conversion reaction to comenic acid in the presence of mineral acid catalyst in such alcohol to give the desired ester. The esterification proceeds at the same time as the conversion to comenic acid. An exemplary catalyst is 3 to 10% of hydrochloric acid, in a gaseous state, in alcohol. In this manner, the reaction proceeds with ease under the same conditions as those utilized for the preparation of comenic acid. The alcohol used in the esterification contains from 1 to 6 carbon atoms.

To further define the invention, when a carbonate is utilized, it may be present in an amount of from about 1 to about 5 weight percent (total weight). The "catalyst" (iron, nickel, cobalt salts) is generally present in an amount of from about 0.01 to about 1 milligram.

When a fermentation liquor is utilized, the gluconic acid concentration therein has generally been found to be from about 1 to about 30 percent by weight.

To further define the "heating time" of the present invention, this time may generally vary from about 30 minutes to about 100 hours, with temperature conditions being from about 50 to about 120° C.

The percent symbols utilized in the specification imply percent by weight. Of course, this would apply to the examples and the claims.

As described above, the method of preparing comenic acid is simple, useful in industry, and furthermore has the great advantage of high yields. The following examples illustrate the invention.

EXAMPLE I 20 g. of crude calcium 2,5-diketo-gluconate (purity about 45% calculated by Katznelson's reduction method) was dissolved in water and a cation exchange resin (Amberlite IR–120) was added to the solution for desalting. The resin was filtered off and the filtrate was diluted to 200 ml. with water. The resultant 4.5% solution of 2,5-diketo-gluconic acid was heated to 100° C. for one hour, 66.5% of the starting material being converted to γ-pyrone derivatives. The production ratio of each γ-pyrone derivative was as follows: Comenic acid: other γ-pyrone derivatives=7.5:2.5.

The reaction mixture was continuously extracted with ether for 45 hours. After removal of the ether, the mixture of γ-pyrone derivatives was washed with a small amount of cool water, the insoluble residue was dissolved with hot water, decolorized with charcoal and the solution was condensed under reduced pressure. A plate or rosette crystal (yield 2.67 g.; 45% of comenic acid) was obtained which melted at 276° C.

EXAMPLE II

Acetobacter melanogenum strain IFO 3292 was fermented in the following culture medium for 3 days.

| Medium: | Percent |
|---|---|
| Glucose | 5 |
| Yeast extract | 0.5 |
| Calcium carbonate | Adequately |
| Water add 100 ml. | |

The fermentation liquor obtained contained 1.5–2.5% 2,5-diketo-gluconic acid. It was heated at 121° C. under 15 pounds/inch$^2$ pressure for 30 minutes. 81.5% of metabolite (2,5-diketo-gluconic acid) was converted into γ-pyrone derivatives. (The production ratio of each γ-pyrone derivative was as follows: comenic acid:other γ-pyrone derivatives=7:3.)

To the reaction mixture, 0.1 g. of charcoal was added and immediately filtered off under suction. The filtrate was passed through a column of cation exchange resin (Amberlite IR–120) to eliminate metal ions. After condensation of the resultant eluate under reduced pressure, the condensate was allowed to stand overnight, 0.8 g. of comenic acid crystallized out, and when the mother liquid was extracted and treated in the same manner as described in Example I, a further 0.15 g. of comenic acid was obtained.

EXAMPLE III 100 ml. of the fermentation liquid obtained according to the procedure described in Example II was centrifuged for 10 minutes at 8000/r.p.m. To the supernatant liquid which formed, a cation exchange resin (Amberlite IR–120) was added for desalting. The mixture was filtered. The resultant filtrate was heated at 50° C. in an incubator for several days, and 73% of the metabolite (2,5-diketo-gluconic acid) was converted to γ-pyrone derivatives. (The reaction mixture contained a great number of comenic acid and a trace of rubiginic acid.) When the reaction mixture was treated in the same manner described in Example II, 1.1 g. of comenic acid was obtained.

EXAMPLE IV

To 10 liters of a solution containing glucose (8%) and yeast extract (0.5%) there was added 1 liter of a previously fermented seed culture of Acetobacter melanogenum (IFO 3292). The mixture was fermented for 3 days at a temperature of 30° C., and was kept at pH between 4.2 and 4.5 by automatically adding sodium hydroxide solution during the fermentation. After the fermentation pH was adjusted to 2.0~4.0 by the addition of sulfuric acid, and the fermentation liquor (containing 2,5-diketo-gluconic acid) was heated for 4 hours at 100° C. The reaction mixture was decolorized with charcoal, concentrated under reduced pressure, acidified with hydrochloric acid and allowed to stand overnight. 241.5 g. of comenic acid was obtained.

EXAMPLE V 10 liters of the fermentation liquid obtained according to the procedure described in Example IV were heated for 4 hours at 100° C. The reaction mixture (adjusted to pH 6.0~6.5 with sodium hydroxide) was decolorized with charcoal, and evaporated under reduced pressure to a small amount whereby 250 g. of sodium comenate was obtained.

EXAMPLE VI

The desalting filtrate obtained according to the procedure described in Example I was evaporated under reduced pressure to dryness, and mixed with 180 ml. of ethyl alcohol containing gaseous hydrochloric acid at concentration of 5%. The mixture was refluxed for 1 hour. After refluxing, excess ethyl alcohol was evaporated and the residue was washed with 200 ml. of water. The crude crystals were recrystallized from hot water to give 4.3 g. of ethyl comenate melting at 126.5° C.

EXAMPLE VII 225 ml. of ethyl alcohol containing gaseous hydrochloric acid at concentration of 5% were added to 20 g. of calcium 2,5-diketo-gluconate (purity about 45% calculated by Katznelson's reduction method), and the mixture was heated under reflux for 1 hour. After heating the calcium chloride produced in reaction mixture was filtered off and the excess ethyl alcohol was evaporated. The residue was washed with 200 ml. of water and the crude crystals were recrystallized from hot water to give 4.5 g. of ethyl comenate melting at 126.5° C.

EXAMPLE VIII

In the same manner as shown in Example VI, 2,5-diketo-gluconic acid of free form was converted to methyl comenate in good yield using methyl alcohol instead of ethyl alcohol in Example VI. Thus, methyl comenate obtained melted at 183° C. (decomp.)

EXAMPLE IX

In the same manner as shown in Example VII, calcium 2,5-diketo-gluconate was converted to propyl comenate in good yield using propyl alcohol instead of ethyl alcohol in Example VII. Thus, propyl comenate obtained melted at 105° C.

What is claimed is:
1. A method of preparing a compound selected from the group consisting of comenic acid and its metal salt which comprises heating an aqueous solution of a member selected from the group consisting of 2,5-diketo-gluconic acid and its metal salt selected from the group consisting of alkaline earth metal salts and alkali metal salts.
2. A method according to claim 1, in which the heating is carried out at a temperature between about 20 to 200° C.
3. A method according to claim 2, in which the heating is carried out at a temperature between about 20 and about 120° C.
4. A method according to claim 1, in which the concentration of the aqueous solution of starting material is from 1 to 30% by weight.
5. A method according to claim 1, in which the heating reaction is carried out in the presence of at least one alkaline earth metal carbonate.
6. A method according to claim 1, in which the heating reaction is carried out in the presence of a catalyst selected from the group consisting of ferric, ferrous, nickel, and cobalt salts, and mixtures thereof.
7. A method according to claim 1, in which the heating is carried out at a pH between about 1.0 and about 7.0.
8. A method according to claim 7, in which the heating is carried out at a pH between about 1.0 and about 4.0.
9. A method as in claim 1, in which the aqueous solution comprises a fermentation liquor containing metal salt of 2,5-diketo-gluconic acid.
10. A method according to claim 1, in which the alkaline earth metal is calcium.
11. A method according to claim 1, in which the alkali metal is sodium.
12. A mehod according to claim 1, in which the alkali metal is potassium.
13. A method of preparing lower alkyl ester of comenic acid which comprises heating a compound selected from the group consisting of 2,5-diketo-gluconic acid and its metal salts with lower alkyl alcohol of from 1 to 6 carbon atoms in the presence of mineral acid.
14. A method according to claim 13, in which the mineral acid is hydrochloric acid.
15. A method according to claim 14, in which the concentration of hydrochloric acid is from 3 to 10% by weight.
16. A method according to claim 13, in which said alcohol is methanol.
17. A method according to claim 13, in which said alcohol is ethyl alcohol.
18. A method according to claim 13, in which said alcohol is propyl alcohol.

No references cited.

NORMA S. MILESTONE, Primary Examiner

U.S. Cl. X.R.
260—345.8